United States Patent [19]

Yokoyama et al.

[11] 4,302,200
[45] Nov. 24, 1981

[54] PROCESS FOR EXTRACTING ANTHOCYANIN-TYPE COLORS FROM NATURAL PRODUCTS

[75] Inventors: Isao Yokoyama; Takeshi Ono, both of Yokohama, Japan

[73] Assignee: The Coca-Cola Company, Atlanta, Ga.

[21] Appl. No.: 155,922

[22] Filed: Jun. 3, 1980

[30] Foreign Application Priority Data

Jun. 8, 1979 [JP] Japan .................................. 54-71143

[51] Int. Cl.$^3$ .......................... C07G 3/00; A23L 1/27; C09B 61/00; C07H 15/04
[52] U.S. Cl. ............................................. 8/438; 536/1; 8/646; 536/4; 260/236.5; 426/429; 426/431; 426/489
[58] Field of Search .................... 8/438; 260/236.5; 536/4

[56] References Cited

U.S. PATENT DOCUMENTS

| | | |
|---|---|---|
| 1,167,006 | 1/1916 | Monti .................................. 426/15 |
| 3,307,954 | 3/1967 | Blakemore .......................... 426/52 |
| 3,437,491 | 4/1969 | Peterson et al. .................... 426/271 |
| 3,484,254 | 12/1969 | Peterson et al. .................... 426/270 |
| 3,963,700 | 6/1976 | Philip ............................... 260/236.5 |
| 4,156,077 | 5/1979 | Pifferi ................................. 8/438 |

FOREIGN PATENT DOCUMENTS 2232579 2/1975 France .................................. 8/438

OTHER PUBLICATIONS

Chem Abstr., vol. 63, 10632c (1965).

*Primary Examiner*—Maria Parrish Tungol
*Attorney, Agent, or Firm*—Gwenetta Douglas Hill; John R. Martin; William J. Speranza

[57] ABSTRACT

A process for the extraction of an anthocyanin-type color from a natural product which comprises bringing the natural product containing said color into contact with a sulfite ion-containing aqueous solution at a temperature of 85° C. or higher for 30 minutes or less, at which time the sulfite ion content of said aqueous solution firstly contacting the natural product is adjusted to at least 10,000 ppm in terms of $SO_2$.

6 Claims, 1 Drawing Figure

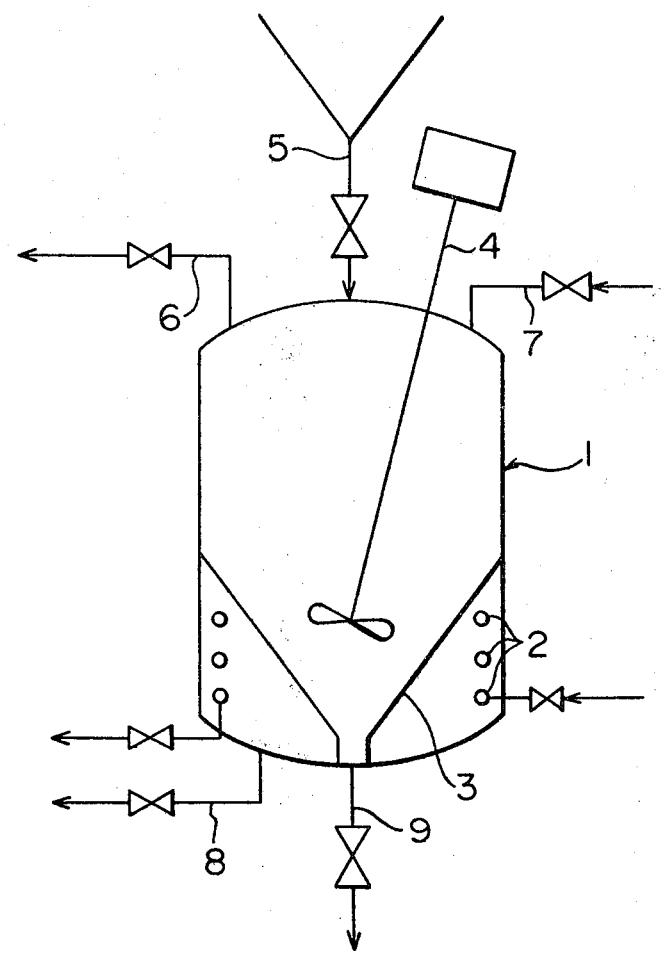

PROCESS FOR EXTRACTING ANTHOCYANIN-TYPE COLORS FROM NATURAL PRODUCTS

This invention relates to a process for extracting an anthocyanin-type color from natural products.

The anthocyanin-type color is a naturally occurring color contained in fruits of plants such as grapes and strawberries, seeds and canes of corns of a certain variety, flowers of certain plants, etc. Being harmless to human bodies, it is a material which has been focused on as a coloring material for food and drink.

Hitherto it has been known that in the method of making red wines by mixing the grape skins with the juice in the presence of $SO_2$ the permeability of epidermal cells is increased by the assistance of the fermentation so as to release the color into the fermenting juice and that the grape skins are sulphited and heated by bringing into contact with the heated juice, followed by mixing the so heated skins with the cooled juice to extract color (Wines and Vines, March 1973, pp. 33, Dr. B. C. Rankine).

In this literature, however, there is no description of the method of extracting color from grape skins at high speed and with a high degree of extraction.

Further, a method has been known of extracting a colored liquid from grape skins at a gentle temperature of 40° C. or lower using a diluted aqueous sulfite solution (e.g. U.S. Pat. No. 3,484,254).

The above conventional methods, however, require a long period of time amounting to several hours for extraction and a color contained in the starting grape skins can be merely extracted therefrom only in amounts of at most 30% by weight based on the total weight of said color.

Further, it is known to treat cherries with a $SO_2$-containing brine (U.S. Pat. No. 3,307,954). But $SO_2$ content of this treating solution is 1–1.5%, and this method is merely to bleach cherries to a light yellow color.

In addition, methods have been hitherto known of extracting pomace of grapes with a warm water at 50°–60° C. (U.S. Pat. No. 1,167,006); adding sulfur dioxide and yeast to wines in the process of treating the wine with an ion exchange agent so as to stabilize the aroma, flavor and color of the wine (U.S. Pat. No. 3,437,491), etc.

Accordingly, an object of the present invention is to provide an advantageous process for the picking of an anthocyanin-type color in the form suitably used as a coloring matter from natural products containing said color.

The above object of the invention can be accomplished by the extracting process which comprises bringing natural products containing an anthocyanin-type color into contact with a sulfite ion-containing aqueous solution at a temperature of about 85° C. or higher for a period of time of about 30 minutes or less, at which time the sulfite ion content of the above aqueous solution at least firstly touching the natural products is adjusted to at least about 10,000 ppm in terms of $SO_2$.

One new aspect of the invention is to have discovered the fact that when the starting natural products are treated with an aqueous solution containing sulfite ions as highly concentrated as at least about 10,000 ppm (in terms of $SO_2$) as an extraction agent at a high temperature of about 85° C. or higher, a color contained in the starting material is extracted therefrom in considerable amounts, in some case 95% or more of the total amount within a very short time of 30 minutes or less and moreover the color is in no way destroyed.

The reason why the above conventional method employed mild temperatures and aqueous sulfite solutions having a low concentration has been based on the prior art knowledge that the color is destroyed by both the high temperature of 70° C. or higher and the aqueous sulfite solution with a high concentration exceeding 2,000 ppm. Accordingly, the above new discovery of the invention is indeed surprising.

In the present invention, it is essential to combine the following three conditions: the sulfite ion content in the extraction agent used is as high as about 10,000 ppm (in terms of $SO_2$); the contact is conducted at a high temperature of about 85° C. or higher; and its contact time is as short as about 30 minutes or less.

When the concentration of sulfite ion in the extraction agent is low, it is impossible to extract the color within a short time even by high-temperature contacting. Accordingly, the color will be destroyed.

When the contact is performed at a low temperature, the color cannot be extracted in a high yield even by using a high-concentration sulfite ion-containing aqueous solution.

The color is destroyed when a long contact is performed using high temperatures and/or an extraction agent having a high concentration of sulfite ions.

The sulfite ion-containing aqueous solution used as an extraction agent in the present invention can be obtained easily by passing sulfur dioxide through water to form an aqueous sulfurous acid solution. As the other extraction agents there can be employed a solution prepared by dissolving in water salts forming sulfite ions in an aqueous solution such as potassium pyrosulfite, potassium hydrogensulfite, sodium hydrogensulfite, ammonium sulfite, potassium sulfite or calcium sulfite.

The content of sulfite ions in the above extraction agent shall be regulated to at least about 10,000 ppm, preferably at least about 30,000 ppm and to the extent of a saturation value (about 50,000 ppm) in terms of $SO_2$.

In the extraction agent, known solvents such as alcohols, for example, ethyl alcohol can be further contained as an auxiliary solvent.

The contact of the extraction agent with the raw material is performed at temperatures of at least about 85° C., preferably about 95° C. or higher and more preferably about 100° C. or higher.

The above contact must be stopped within a short time, e.g. within about 30 minutes, preferably within about 15 minutes. The contact under the above conditions can be suitably ceased by withdrawing the extract to the outside of the system to allow it to cool or injecting cold water into the extraction system, thereby quenching and diluting it.

The above high temperature contact of the natural product and the sulfite ion-containing aqueous solution can be performed by the method comprising mixing said salts forming sulfite ions with the raw material natural product in solid form, e.g. in powder form, successively adding water to dissolve it and heating the solution, or the method comprising blowing steam immediately into a mixture consisting of said raw material natural product and solid-like salts.

A suitable embodiment of the instantly claimed extracting process will be explained below by reference to the accompanying drawing.

In the accompanying drawing there is shown a schematic view of an apparatus to be used for practising the method of the extraction of the present invention.

In the drawing, 1 is the main body of an extractor in which a heating hose 2, a conical metal mesh 3 for separating raw materials from the extract and an agitator 4 are provided, and 5 is a pipe for feeding raw materials and an extraction agent, 6, a pipe for exhausting $SO_2$ gas, 7, a pipe for introducing cold water, 8, a pipe for draining an extract and 9, a pipe for exhausting an extraction residue.

The inside of the extractor 1 is preheated by passing steam through the hose 2. When the temperature of its inside has reached a fixed temperature of 85° C. or higher, raw materials, e.g. grape skins, are charged into the extractor through the pipe 5 for introducing the raw material and extraction agent. During this time, heating of the extractor is continued. After the temperature of the charged grape skins has reached a fixed temperature, an extracting liquid with a fixed concentration of sulfite ions of at least about 10,000 ppm ($SO_2$ conversion) is injected into the extractor through the pipe 5 for introducing the raw material and extraction agent, and concurrently the agitator 4 is rotated to bring the raw materials and the extraction agent into intimate contact with each other, thereby to initiate the extraction. At the beginning of extraction the extraction agent comes into contact with the raw material at the fixed temperature while maintaining the initial concentration of sulfite ion, but gradually with the releasing of $SO_2$ gas, the sulfite ion concentration decreases. During the initial contact, a considerable part of the color is extracted and the amount of the color extracted reaches a maximum within about 30 minutes from the beginning of contact, in many cases, within about 15 minutes. During the extraction period, released $SO_2$ gas is discharged to the outside of the extractor by opening a valve disposed on the pipe 6 for exhausting $SO_2$ gas. On reaching the end point of the fixed extraction period heating is stopped and cold water is introduced into the extractor from the pipe 7 for feeding cold water to quench the extraction system. Depending on circumstances, the valve on the pipe 8 for draining the extract may be opened to drain the extract to the outside of the extractor and to allow it to cool instead of introducing cold water. In the case of introducing cold water, it is advisable to use water at a temperature and in amounts sufficient for the extraction system to be cooled to about 60° C. or below, preferably about 40° C. or lower. The extract quenched and diluted with cold water fed is drained from the pipe 8 for draining the extract. On the other hand, the pomace of grape after being subjected to the extraction treatment remains within the extractor as a result of being interrupted by a conical metal mesh. This results in separating the extract and the extraction residue of the pomace of grape from each other. When the extraction system is quenched by a supply of cold water, there is no longer any risk of destroying the color even by leaving the cooled and diluted extract to stand within the extractor for an optional period of time. Anyhow, it is better to separate the extract from the extraction residue of the grape skins at as an early period of time as possible. When the extract is left to stand for an excessively long time, the extracted color is adsorbed to the extraction residues to lower the yield of the color in some case.

The residue separated from the extract is washed in water injected suitably through the pipe 7 for introducing cold water and thereafter is drained to the outside of th extractor for abandonment by opening a valve on the pipe 9 for draining the extraction residue.

The wash liquid is drained from the pipe 8 for draining the extract and is combined with the prior extract or diluted extract, after which the resulting mixture can be subjected to a purification process, for example, centrifuging and treatment with an ion exchange agent.

The so obtained extract or purified extract may be used as a coloring liquid either as such or in the concentrated form. Further, it can be possessed into a solid coloring material by subjecting to known drying and solidifying processes, for example, spray drying, freeze drying or vacuum drying.

One embodiment of the process of the present invention was explained above on the basis of the apparatus illustrated in the accompanying drawing. In addition, the present invention can be performed by the method comprising bringing the raw material and sulfite ion-containing aqueous solution into contact with each other at a high temperature in a hollow container and then withdrawing the total content to the outside of the container, separating the extract from the residue thereby to cool the extract, or the method of cooling the extract forcibly comprising adding a cold water thereto, or the method of cooling a mixture of the extract and residue withdrawn to the outside of the container comprising injecting a cold water thereinto.

The extracting process of the invention explained above is suitable for use in extracting anthocyanin-type color from the pomace of grapes occurring during the production of wine or grape juice, grape skins or skins of berries. Further, the present process can be employed in order to extract anthocyanin-type color from other natural products such as optional plants containing said color for example, purple corns.

The extracting process of the invention is a very advantageous method enabling pigments contained in the raw materials to be extracted therefrom in an about 40% or more yield, in many cases, about 80% or more of the total content within a very short time and without destroying it.

The process and advantages of the invention will be further explained by way of the following examples.

All the percentages mentioned in these examples are calculated by weight unless otherwise specified. Further, the concentration of color in the extract was determined by following the procedure stated below.

The extract is centrifuged at 10,000 rpm for 10 minutes, following which a sample liquid is taken from the resulting transparent liquid by weighing. The sample liquid is evaporated to dryness at a temperature of 30°–35° C. under vacuum using a rotary evaporator. Then the resulting dry solid is dissolved in a buffer solution at pH 2.61 containing 0.1 mol of sodium citrate and hydrochloric acid. This is followed by diluting the solution to a fixed volume. After leaving the solution to stand for 1 hour, it is again centrifuged. Thereafter, the coloring intensity of the resulting transparent liquid is measured by the absorption of a light having a wavelength of 520 millimicrons using a spectrophotometer. From the value so measured is calculated the concentration of color ($\mu$g/g) in the test liquid.

The degree of extraction was calculated from the above concentration of color by way of the following formula $$\text{Degree of extraction} = \frac{\text{Concentration of color in the test liquid } (\mu g/g) \times \text{Amount used of the extraction agent (g)}}{\text{Total amount of color in the raw materials (g)}} \times 100(\%)$$

EXAMPLE 1

Into a 25 l extractor of the type shown in the drawing is charged 5 kg of the pomace of a French wine through a pipe for feeding raw materials when the extractor is preheated by passing steam in the heating hose and its inner temperature reaches 100° C. The analytical values of the charged pomace are:

Skins: 66.4%
Stems: 10.5%
Seeds: 23.1%
Antocyanin content (based on wet pomace): 0.1574%

When heating is continued by means of the above heating hose and the temperature of the pomace reaches 100° C. 7.5 Kg of an aqueous sulfurous acid solution having $SO_2$ content of 50,000 ppm is fed into the extractor through the pipe for supplying an extraction agent (same as the pipe for supplying raw materials). About 5 minutes later, the temperature of the extraction agent reached 100° C. After continuously heating the extraction agent for an additional 10 minutes, the heating is stopped, and concurrently 12.5 Kg of cold water at 0° C. is injected into the extractor through the pipe for feeding cold water. Ten minutes after the completion of the heat extraction period, the valve on the pipe for draining the extract is opened to withdraw the extract. At this time, the temperature of the extract was 50° C.

The concentration of the color in the resulting extract is measured (by diluting the test extract taken to 10 times its volume), following which the value of 382.15 μg/g is calculated from the absorption value of light (having a wavelength of 520 millimicrons) of 0.710. This corresponds to the total amount extracted of color of 7.643 g and the degree of extraction of 97.12% (The total color content in the raw materials is 7.87 g.).

EXAMPLES 2 AND 3

The extraction was conducted as in Example 1 except that the temperature of the injected cold water was fixed at 5° C. and 17° C. respectively. According to an example of injecting cold water at 17° C. however, the extract was separated therefrom 15 minutes after the completion of the heat extraction period.

The extract is measured by following the procedure of Example 1 to obtain the results shown in Table 1. In Table 1 the results obtained in Example 1 are shown jointly.

TABLE 1

| Ex. No. | Injected cold water Temperature (°C.) | Extract Light absorption value | Color concentration (μg/g) | Total amount of color (g) | Degree of extraction (%) |
|---|---|---|---|---|---|
| 1 | 0 | 0.710 | 382.15 | 7.6430 | 97.12 |
| 2 | 5 | 0.660 | 354.76 | 7.0952 | 90.16 |
| 3 | 17 | 0.510 | 276.65 | 5.5330 | 71.11 |

EXAMPLE 4, COMPARATIVE EXAMPLES 1 AND 2

The extraction was performed by following the procedure of Example 3 except that the heating temperature was fixed at 86°–88° C., 80°–83° C. and 70°–75° C. respectively during the extraction period and that the extract was separated therefrom 5 minutes after injecting cold water. This extract was tested as in Example 1.

The results obtained are shown in Table 2.

TABLE 2

| | Heating temperature (°C.) | Extract Light absorption value | Concentration of color (μg/g) | Total amount of color (g) | Degree of extraction (%) |
|---|---|---|---|---|---|
| Example 4 | 86–88 | 0.302 | 157.69 | 3.1538 | 40.10 |
| Comparative Example 1 | 80–83 | 0.211 | 114.63 | 2.2926 | 29.19 |
| Comparative Example 2 | 70–75 | 0.151 | 82.33 | 1.6466 | 20.92 |

EXAMPLES 5 AND 6, COMPARATIVE EXAMPLES 3, 4 AND 5

Into a 2 l glass container is charged 300 g of an aqueous solution of sulfurous acid with the fixed concentration, after which 200 g of the same pomace from French wine as used in Example 1 are immersed in the solution. Then the resulting mixture is heated to 100° C. with stirring by the direct flame of a gas burner, and is maintained at this temperature for 15 minutes. After the completion of this period, heating is stopped immediately, and concurrently the mixture is quenched by adding 500 g of cold water at 15° C. After stirring for the prescribed period of time, the extract is separated from the extraction residue, and the concentration of color in the resulting extract is measured by following the procedure of Example 1. There are obtained the results shown in Table 3.

TABLE 3

| | Extraction agent $SO_2$ concentration (ppm) | Holding time (min.) | Extract Light absorption value* | Concentration of color (μg/g) | Total amount of color (mg) | Degree of extraction (%) |
|---|---|---|---|---|---|---|
| Example 5 | 50,000 | 18 | 0.519 | 281.5 | 225.2 | 71.5 |
| Example 6 | 25,000 | 18 | 0.781 | 211.3 | 169.0 | 53.7 |
| Comparative Example 3 | 5,000 | 17 | 0.563 | 152.65 | 122.12 | 38.8 |
| Comparative Example 4 | 1,000 | 20 | 0.260 | 70.76 | 56.6 | 18.0 |
| Comparative | 0 | 17 | 0.278 | 75.62 | 60.5 | 19.0 |

TABLE 3-continued

| | Extraction agent SO₂ concentration (ppm) | Holding time (min.) | Light absorption value* | Extract Concentration of color (μg/g) | Total amount of color (mg) | Degree of extraction (%) |
|---|---|---|---|---|---|---|
| Example 5 | | | | | | |

*Determined by diluting the test liquid taken to 10 times, 2 times and 5 times the original volume in Example 5, Comparative Example 5 and others Examples, respectively.

COMPARATIVE EXAMPLES 6–8

In a 1 l three-necked flask equipped with an agitator is put 100 g of the same pomace from French wine as used in Example 1, after which the flask is maintained at 45° C. under agitation. This is followed by the addition of 800 g of an aqueous solution of sulfurous acid having the fixed concentration and then the solution is kept at the above temperature under agitation to effect the extraction for 4 hours.

After adding an extraction agent, a small amount of the extract is taken as a sample to test the degree of extraction each time after lapse of the prescribed time. The results obtained are shown in Table 4.

TABLE 4

| | Extraction agent SO₂ concentration (ppm) | Degree of extraction (%) | | | | | |
|---|---|---|---|---|---|---|---|
| | | After 15 min. | 30 min. | 1 hr. | 2 hr. | 3 hr. | 4 hr. |
| Comparative Example 6 | 5,000 | 9.5 | 14.5 | 19.5 | 24.5 | 27.5 | 31 |
| Comparative Example 7 | 3,000 | — | — | 14.0 | 20.5 | 24 | 27 |
| Comparative Example 8 | 1,000 | — | — | 11.0 | 16 | 19.5 | 22.5 |

EXAMPLE 7

The extraction was conducted by following the procedure of Example 1 except that immediately after completion of the heat extraction period the extract was drained to the outside of the extractor instead of injecting cold water. Then the extract was tested by following the procedure of Example 1. The results obtained are shown in Table 5.

TABLE 5

| | Extract | | | |
|---|---|---|---|---|
| | Light absorption value | Concentration of color (μg/g) | Total amount of color (g) | Degree of extraction (%) |
| Example 7 | 0.573 | 310.70 | 6.214 | 78.82 |

What we claim is:

1. A process for the extraction of an anthocyanin-type color from a natural product which comprises bringing the natural product containing said color into contact with a sulfite ion-containing aqueous solution at a temperature of 85° C. or higher for 30 minutes or less, at which time the sulfite ion content of said aqueous solution firstly contacting the natural product is adjusted to at least 10,000 ppm in terms of $SO_2$.

2. A process as set forth in claim 1 in which the natural product containing an anthocyanin-type color is contacted with the sulfite ion-containing aqueous solution at a temperature of about 95° C. or above.

3. A process as set forth in claim 1 or 2 wherein the natural product containing an anthocyanin-type color is contacted with the sulfite ion-containing aqueous solution for about 15 minutes or less.

4. A process as set forth in claims 1, 2 or 3 in which the sulfite ion content of the sulfite ion-containing aqueous solution at least firstly contacted is at least about 30,000 ppm in terms of $SO_2$.

5. A process as set forth in claim 1 wherein at least 40% of the anthocyanin-type color contained in said natural product is extracted from said natural product.

6. A process as set forth in claim 1 in which the natural product containing an anthocyanin-type color is pomace of grapes, grape skins, skins of berries or purple corns.

* * * * *